Figure 1:
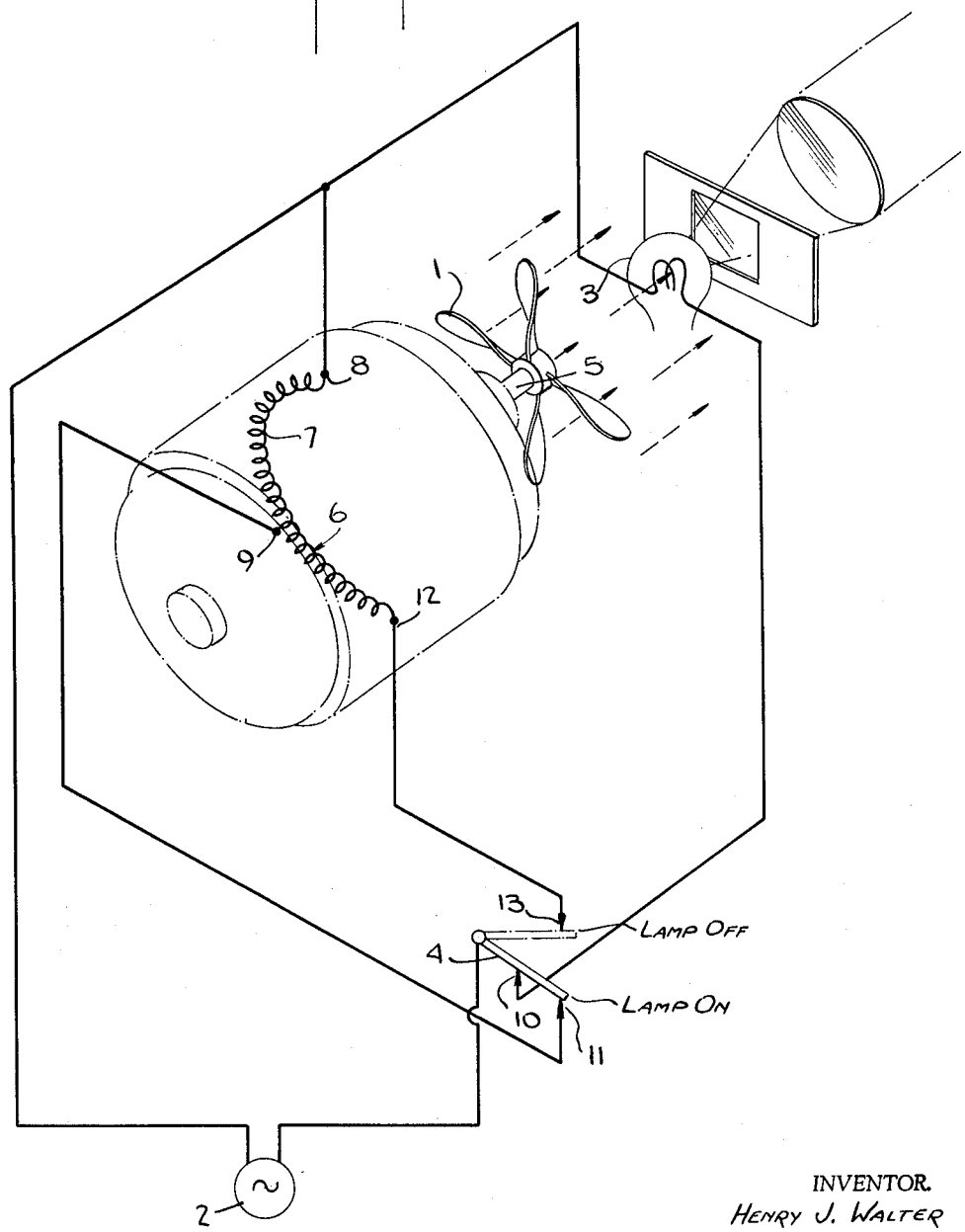

June 23, 1964 H. J. WALTER 3,138,715
TWO SPEED COOLING FAN PROJECTOR
Filed Jan. 23, 1962

INVENTOR.
HENRY J. WALTER
BY
[signature]
ATTORNEY

3,138,715
TWO SPEED COOLING FAN PROJECTOR
Henry J. Walter, Bethpage, N.Y., assignor to Airequipt Manufacturing Company, New Rochelle, N.Y., a corporation of New York
Filed Jan. 23, 1962, Ser. No. 168,076
3 Claims. (Cl. 307—11)

The present invention relates to an improved cooling means for projectors and more particularly to an automatically controlled two-speed fan system for such equipment.

Projection equipment such as slide projectors or motion picture projectors require high power lamps in order to obtain clear projection with a satisfactory enlargement. No matter what type of lamp is used, its presence in the projector optical system places a heat source near the other elements of the optical system and in particular adjacent to the film being exhibited. These lamps themselves are made with a small size glass envelope in order to permit the projection equipment to be a convenient size. The small size of these lamps and their confinement within the enclosure of the optical system requires forced air cooling both to protect the lamps themselves from the failure due to over heating and to keep the temperature of the film and the other optical elements as low as possible to eliminate any chance of heat damage.

To provide the cooling air, it is conventional practice to mount a suitable cooling fan in projection equipment and to have either a separate switch controlling the fan or to have the fan directly coupled to the lamp control switch so that the fan runs while the lamp is on or to have no switch for the fan at all so that the fan operates as long as the projector is plugged in. These present systems have not been fully satisfactory as the use of an independent switch has left the fan operation under the control of the operator and failure to run the fan for a suitable cool-off period after the lamp has been extinguished has resulted in premature failure of the lamps and damage to the films and the optical elements from over heating. Projectors having the fan and the lamp controlled by a single switch for simultaneous operation insure fan operation while the lamp is on, however, this arrangement prevents the operator from operating the fan after the lamp has been turned off. This prevents forced air cooling of the lamp after its filament is turned off so that the lamp filament and envelope may be overheated and damaged from the residual heat in the lamp and the adjacent metal of the projector housing. Thus, many projector lamps are damaged after they have been extinguished from the residual heat in the projector and before the lamp has cooled sufficiently to regain its regular cool strength.

Even where operators are sufficiently experienced so that they know that the lamp must be cooled by the fan for several minutes after the lamp has been turned off or if the fan is wired to stay on as long as the projector is connected, the relatively high and objectionable noise accompanying fan operation after the termination of the film exhibitions has tended to cause this important cooling operation to be shortened or eliminated.

Accordingly, an object of the present invention is to provide an automatic projector cooling system which will protect the projector lamp by insuring an adequate cooling period after the lamp has been turned off and which will provide this protection at an inaudible sound level.

Another object of the present invention is to provide an automatically operated two-speed cooling fan system for projectors.

Another object of the present invention is to provide an automatically operated two-speed cooling system using negligible additional components over present cooling systems.

Another object of the present invention is to provide a two-speed fan cooling system for projectors having an inaudible cooling operation at its lower speed.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawing, forming a part of the specification, wherein:

FIG. 1 is a schematic diagram illustrating a preferred embodiment of the cooling system.

I have found that there is an extremely sharp decrease in the sound level for typical projector cooling fans as the fan speeds are reduced and that this drop in sound level occurs at a greater rate than the cooling effect. Thus, I have found that a projector requiring a fan speed of about 3500 r.p.m. for satisfactory cooling during projector operation will provide for an adequate cooling effect to protect the projector lamp after it has been extinguished while the fan is running at about 1500 r.p.m. or at less than half speed. When the speed is thus reduced, more than adequate air flow is provided over the lamp and the adjacent portions of the optical system while at the same time the fan noise is inaudible and well below 45 db.

The system illustrated in FIG. 1 is a preferred embodiment of my automatic two-speed fan system. In general this system operates by having the projector cooling system connected so that the cooling fan 1 is driven to operate at its low speed as soon as the projector is connected to the regular power source 2. This means that the fan 1 will be running as long as the projector power plug 3 is in even though the projector lamp 3 is off. The control switch 4 for the lamp 3 is also coupled into the fan control circuit so that the fan 1 is switched to its high speed operation whenever the lamp 3 is turned on.

In the embodiment illustrated in FIG. 1, a shaded pole motor 5 has a tapped winding 6 including a regular high speed portion 7 between terminal 8 and tap 9. When the switch 4 is turned to the lamp-on position coupling the power source 2 to the lamp 3 through contact 10, contact 11 of switch 4 energizes the high speed portion 7 of the motor 5 by coupling this portion of the motor coil to the power source 2. When thus connected the motor 5 drives the fan 1 at sufficient speed such as 3500 r.p.m. to properly cool the energized lamp 3 and the adjacent projector elements. When the lamp 3 is switched off by switch 4 and as long as the projector remains connected to the power source 2, the motor 5 has the entire winding 6 between the terminals 8 and 12 coupled to the power source 2 through switch contact 13. This additional winding is proportioned to drive the motor 5 with reduced power and thus reduced speed such as, for example, 1500 r.p.m. This lower and inaudible speed of the fan 1 provides sufficient cooling to protect the lamp after it has been turned off. This protection is automatically obtained as long as the projector remains connected to the power source 2. Switch 4 may be a relay where remote operation is provided for.

It will be seen that a simple and effective automatic control is disclosed which provides for an automatic reduction in cooling fan speed and fan noise when a projector lamp is turned off. The system in one embodiment obtains this automatic control by a novel yet simple shaded pole motor coupling. It is clear that the novel control effect may also be obtained by the addition of other voltage reducing elements in the lamp switching connections. The automatic control is thus easily incorporated into otherwise conventional projector designs.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. An improved cooling system for a projector lamp comprising the combination of a fan motor, a lamp, a double throw switch having a switch arm for coupling a common contact to a first switch contact in one position and to a pair of separate switch contacts in a second position, a conductor connecting one side of the motor and one side of said lamp and adapted for connection to a source of electric power, a second conductor coupled to said common switch contact and having its opposite end adapted for connection to the source of power, a conductor connecting said first switch contact to said motor through a motor speed reducing means, a conductor connecting one of said separate switch contacts to the other side of said lamp, a conductor connecting the other of said separate switch contacts to the motor whereby said lamp is energized and said motor runs at a higher speed when said first and second conductors are coupled to a source of power and said switch is in said second position, and said lamp is extinguished and said motor runs at a relatively lower speed when said switch is in its said one position.

2. An improved cooling system for a projector lamp comprising the combination of a shaded pole fan motor having a tapped winding, a lamp, a double throw switch having a switch arm for coupling a common contact to a first switch contact in one position and a pair or separate switch contacts in a second position, a conductor coupled at one end to one end of the motor winding and to one side of said lamp and adapted for having its opposite end connected to a source of electric power, a second conductor connected at one end to said common contact and having its opposite end adapted for connection to the source of power, a conductor connecting said first switch contact and the opposite end of said motor winding, a conductor connecting one of said separate switch contacts to the other side of said lamp, a conductor connecting the other of said separate switch contacts to the tap on the motor winding whereby said lamp is energized and said motor runs at a higher speed when said first and second conductors are coupled to a source of power and said switch is in said second position and said lamp is extinquished and said motor runs at a relatively lower speed when said switch is in its said one position.

3. The system as claimed in claim 2 in which said tap on the motor winding is positioned to cause said lower motor speed when said switch is in said position to be less than half the higher motor speed when said switch is in said second position.

References Cited in the file of this patent
UNITED STATES PATENTS
2,456,530    Nemeth _____ Dec. 14, 1948